US009860736B1

(12) United States Patent
Bruner et al.

(10) Patent No.: US 9,860,736 B1
(45) Date of Patent: Jan. 2, 2018

(54) PROVIDING NETWORK RESOURCE ACCESS BASED ON A PURPOSE IDENTIFIER

(71) Applicant: Microsoft Technology Licensing, LLC, Redmond, WA (US)

(72) Inventors: John Bruner, Bellevue, WA (US); Marc Means, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/283,252

(22) Filed: Sep. 30, 2016

(51) Int. Cl.
  H04M 3/00 (2006.01)
  H04W 8/18 (2009.01)
  H04W 76/04 (2009.01)
  H04W 76/02 (2009.01)
  H04W 48/18 (2009.01)

(52) U.S. Cl.
  CPC ............. *H04W 8/18* (2013.01); *H04W 48/18* (2013.01); *H04W 76/021* (2013.01); *H04W 76/045* (2013.01)

(58) Field of Classification Search
  CPC ..... H04W 8/18; H04W 48/18; H04W 76/021; H04W 76/045; H04W 4/02; H04W 8/183; H04W 76/00; H04L 67/14; H04L 67/30; H04L 12/2856; H04L 12/2859; H04L 12/2876; H04L 12/4641; H04L 63/0272; H04L 63/104; H04Q 7/20; G06F 21/53
  USPC .......... 455/418; 370/359, 230; 379/224, 269
  See application file for complete search history.

(56) References Cited

U.S. PATENT DOCUMENTS

| 7,096,015 | B2 * | 8/2006 | Bridges | H04W 4/24 455/432.1 |
| 8,200,773 | B2 * | 6/2012 | Bluestone | G06F 21/53 709/217 |
| 9,276,770 | B2 * | 3/2016 | Shimomura | H04L 12/4641 |
| 9,338,279 | B2 * | 5/2016 | Kuehnel | H04W 52/0274 |
| 2003/0028650 | A1 * | 2/2003 | Chen | H04L 12/4641 709/229 |

(Continued)

FOREIGN PATENT DOCUMENTS

| FI | CA 2413719 C | * 9/2009 | H04W 8/06 |
| KR | WO 2016153303 A1 | * 9/2016 | |

(Continued)

OTHER PUBLICATIONS

"CM_CellularEntries CSP", Hardware Dev Center, retrieved from https://msdn.microsoft.com/en-us/library/windows/hardware/dn914761(v=vs.85).aspx on Sep. 30, 2016, 9 pages.

*Primary Examiner* — Mahendra Patel

(57) ABSTRACT

A system is disclosed that provides network resource access to applications and/or services based on a purpose or intent. Network resources may be assigned one or more purpose identifiers that indicate the network resource can handle a defined type of data transfer and/or use. Applications request connections based on the purpose required for the connections by including a corresponding purpose identifier in the request. In response to the request, the applications receive connection profiles which abstract the specific configurations for connection to the network resources. The applications connect to the network resources via the connection profiles but without knowledge of the configuration data.

20 Claims, 6 Drawing Sheets

(56) References Cited

U.S. PATENT DOCUMENTS

| | | | | |
|---|---|---|---|---|
| 2004/0125745 A9* | 7/2004 | Dang | ............... | H04L 41/0663 370/217 |
| 2005/0260989 A1* | 11/2005 | Pourtier | ............... | G06F 9/443 455/435.3 |
| 2007/0067446 A1* | 3/2007 | Jones | ............... | H04L 12/5692 709/224 |
| 2013/0322419 A1* | 12/2013 | Fedotenko | ............ | H04W 8/183 370/338 |
| 2016/0072721 A1* | 3/2016 | Hill | ............... | H04L 67/303 709/226 |
| 2017/0048251 A1* | 2/2017 | Guday | ............... | H04W 12/08 |
| 2017/0048713 A1* | 2/2017 | Guday | ............... | H04W 12/08 |

FOREIGN PATENT DOCUMENTS

| | | | | |
|---|---|---|---|---|
| SE | WO 9827765 A3 * | 10/1998 | ......... | H04Q 11/0457 |
| WO | WO 2016060897 A1 * | 4/2016 | ............ | H04W 8/065 |
| WO | WO 2016201398 A1 * | 12/2016 | ............ | H04L 67/306 |

\* cited by examiner

PROVIDING NETWORK RESOURCE ACCESS BASED ON A PURPOSE IDENTIFIER

BACKGROUND

User applications on computing devices require connections to reach network resources, and those connections can vary from one provider network to another (e.g., from one mobile operator to another). Further, the applications may require corresponding access to the network resources while changing provider networks. Some existing applications are programmed with knowledge of the unique connection configurations of each provider network, but this is complex and intensive.

For instance, an application may run on a mobile device for which a user changes a subscriber identity module (SIM) card and thereby changes mobile operators, such that a set of connections for the new mobile operator associated with the new SIM card is different than the previous set of connections. When the mobile device changes to a different mobile operator, the application may be pre-programmed with knowledge of a gateway that allows the mobile device to connect to the network resources via that mobile operator. However, with numerous possible mobile operators each having unique connection configurations for varying network resources, and with changes that may occur with these over time, it is difficult to properly prepare the application for connection to the mobile operators. Further, the application may support different types of data transfer (e.g., video, audio, messaging, etc.), and the application does not know which available connection may provide the best user experience for each type of data transfer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system comprises at least one processor; and at least one memory comprising computer program code and a mapping, the mapping representing a correspondence between purpose identifiers and connection profiles, the at least one memory and the computer program code configured to, with the at least one processor, cause the at least one processor to: receive, from a process, a request for a first connection and a second connection to at least one network provider resource, the request including a first purpose identifier associated with the first connection and a second purpose identifier associated with a second connection; in response to the received request, identify, based on the mapping stored in the memory, a first connection profile associated with the first purpose identifier and a second connection profile associated with the second purpose identifier; and provide the process with the identified first and second connection profiles to enable the process to access the at least one network provider resource via the identified first and second connection profiles.

A computerized method comprises operations for receiving, from a process, a request to connect to a network provider resource, the request including a purpose identifier. In response to the received request, a connection profile associated with the purpose identifier is identified based on a mapping. The mapping represents a correspondence between purpose identifiers and connection profiles. The connection profile is associated with configuration data for connecting to the network provider resource. The identified connection profile is provided to the process to enable the process to access the network provider resource via the identified connection profile without knowledge of the configuration data.

One or more computer storage media have computer-executable instructions that, upon execution by a processor, cause the processor to receive, from an application, a connection request for a network provider resource, the connection request including at least one purpose identifier; identify at least one connection profile associated with the at least one purpose identifier, the connection profile associated with configuration data for connecting to the network provider resource; and initiate a communication session between the application and the network provider resource via the identified at least one connection profile, without providing the configuration data to the application.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 6, the electronic devices are illustrated as schematic drawings. The drawings may not be to scale.

DETAILED DESCRIPTION

Figure 1:
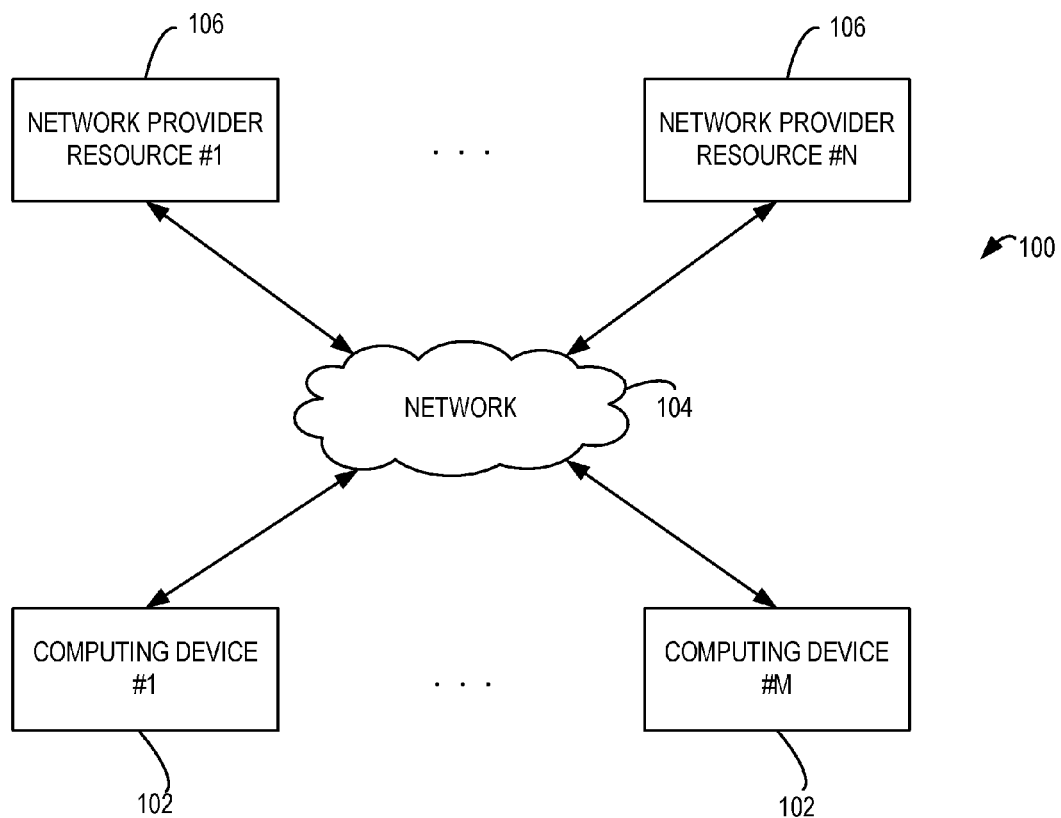
FIG. 1 illustrates a block diagram of an example system of networked computing devices.

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a smartphone, tablet computer, or the like, this is only an exemplary implementation and not a limitation. As those skilled in the art will appreciate, the present embodiments are suitable for application in a variety of different types of computing devices, for example tablet computers, music players etc., wherein applications disposed on the computing device may require access to different types of network resources.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer', 'computing device', and 'computing apparatus' each may include PCs, servers, laptop computers, mobile telephones (including smart phones), tablet computers, media players, games consoles, personal digital assistants, wearable devices, and many other devices.

The system described herein provides access to network resources to applications and/or services based on an identified purpose identifier. Network resources may be assigned one or more purpose identifiers that indicate a defined type of data transfer and/or use associated with the network resource, such as voice over Internet Protocol (VOIP), video streaming, messaging, location services, etc. The applications may be designed such that they request a connection based on the purpose of the connection, with a corresponding purpose identifier included in the request. The applications need not be programmed with specific knowledge of the underlying networks (e.g., without knowledge of the various connection configurations of the different provider networks). Rather, an operating system (or other logic) on the device maintains the specific configuration information and/or parameters for connections to the various network resources on the different provider networks, as well as the corresponding purpose identifiers. For instance, connection-specific configuration parameters may include a cellular access point name (APN), internet protocol (IP) address type (IPv4, IPv6, etc.), network credentials, proxy configuration parameters, default gateways and/or routers, default name servers, wireless local area network (WLAN) service set identifier (SSID), authentication methods and/or credentials (Wi-Fi protected access (WPA/WPA2) with pre-shared key, extensible authentication protocol-transport layer security (EAP-TLS), protected extensible authentication protocol-challenge handshake authentication protocol (PEAP-CHAPv2), etc.), etc. The configuration information and/or parameters are part of what may be referred to as configuration data associated with connection profiles. In some examples, the applications on the device only need to identify a purpose identifier to the operating system, and those applications receives a connection profile in return that allows the applications to access the desired network resources. For example, the applications invoke an application programming interface (API) call using the identified connection profile to connect to the desired network resource, without explicit knowledge of the underlying configuration data.

Aspects of the disclosure abstract underlying mobile operator networks from the network resources (e.g., services). Further, aspects of the disclosure are operable in instances where a user changes mobile operators (e.g., by changing a SIM card), such that a set of connections for the new mobile operator associated with the new SIM card is different than the previous set of connections.

One application may require access to different network resources (e.g., different purposes). For example, the same application may support both video streaming and instant messaging, which may require connection to different network resources. In this example, the application identifies two purpose identifiers (e.g., at the same time or different times) and is able to initiate and/or maintain separate, simultaneous and/or sequential connections to different network resources (e.g., using different connection profiles provided by the operating system). In this manner, aspects of the disclosure abstract connection by the applications and/or services to the available network resources.

FIG. 1 illustrates a block diagram of a system of networked computing devices according to an embodiment. The system 100 includes computing devices 102, a network 104 (e.g., a provider network), and network provider resources 106 (e.g., network resources). It should be understood that the computing devices 102 may include PCs, servers, laptop computers, mobile telephones (including smart phones), tablet computers, media players, games consoles, personal digital assistants, augmented or virtual reality devices, and many other devices, as described above.

While only one network is shown in FIG. 1, the network 104 may include one or more combined and/or separate networks, such as cellular networks, Wi-Fi networks, costed networks, free networks, or any other type of network useful for transmitting and/or transferring data between computing devices, servers, etc. Further, these networks 104 may be provided or managed by one or more network providers.

In an example, the network provider may provide access to network resources 106, other networks, other parts of network 104, other computing devices that are also connected to the network provider resources 106, etc. The network provider may provide different types of network connections to computing devices, such as computing devices 102, that make use of the network 104 and/or other networks. In an example, the network provider resource 106 may be accessible through the Internet via a cellular network. Alternatively or in addition, the network provider resource 106 may stream a video feed via a Wi-Fi network. In an example, the computing device 102 may make use of multiple network connections associated with one or more of the network provider resources 106. For instance, a computing device 102 may use a connection to a network provider resource 106 over a cellular network to complete a voice call and another connection to a different network provider resource 106 over a Wi-Fi network to download media to the computing device 102.

In an example, connections to the network provider resources 106 may be via mobile operator networks which that have unique provisioning and/or specific implementations for the offered resources.

Figure 2:
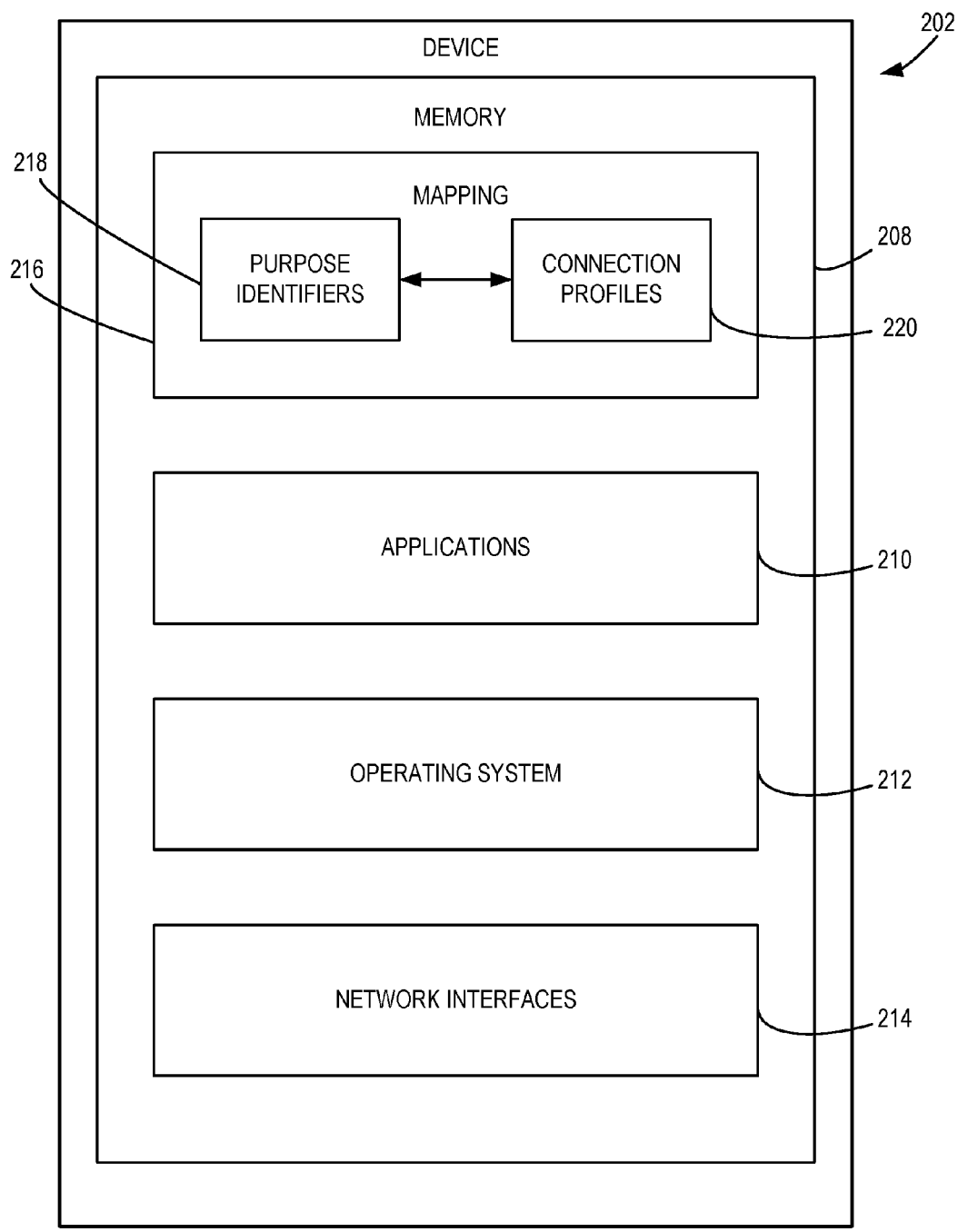
FIG. 2 illustrates a block diagram of an example computing device comprising a memory.

FIG. 2 illustrates a block diagram of a computing device 202 comprising a memory 208. The computing device 202 includes the memory 208 for storing data. The memory 208 stores one or more applications 210, an operating system 212, and network interfaces 214. Further, the memory 208 stores a mapping 216 or other correspondence that includes purpose identifiers 218, connection profiles 220, and relationships between the purpose identifiers 218 and the connection profiles 220.

The applications 210 may include user applications, partner services, other services, and the like. For instance, an application 210 may be a social media application, a video streaming application, a service that enables voice calls on a mobile device, a rich communication service (RCS), a location service, etc. The applications 210 may require access to network resources (e.g., network provider resources 106, etc.) via the network interfaces 214 to perform functions on the computing device 202.

The operating system 212 of the computing device 202 may provide APIs that enable the applications 210 to initiate connection sessions with the network resources. The APIs may include a connection profile interface that provides connection profiles to the applications 210 in response to connection requests including purpose identifiers as described below (e.g., FindConnectionProfile( )), and that returns (and/or initiates) communication sessions (e.g., AcquireConnection( )).

The operating system 212 connects to the network interfaces 214, which enable communication via networks connected to the computing device 202. In an example, the network interfaces 214 enable the computing device 202, the operating system 212, and applications 210 disposed on the computing device 202 to interact and/or communicate with network provider resources 106 and the like via the network 104.

The memory 208 stores the mapping 216 of relationships between purpose identifiers 218 and connection profiles 220. For instance, each connection profile 220 may be associated with one or more purpose identifiers 218, and each purpose identifier 218 may be associated with one or more connection profile 220.

The purpose identifiers 218 are identifiers, codes, or the like, which are associated with a purpose or intent for which an application may require a network resource. A purpose identifier 218 may be created by an application or service provider and associated with the particular purpose or intent. The purpose identifiers 218 (including newly-created purpose identifiers) may be communicated to the network providers that offer the network resources which satisfy the purpose associated with the purpose identifier 218. The network providers may then provision qualified computing devices with the purpose identifier 218 along with connection details in the form of a connection profile (e.g., connection profiles 220, etc.). Alternatively, the network providers may communicate the purpose identifiers 218 to the operating systems 212, such as via a software update through an operating system provider. In this manner, the computing devices 202 are provisioned with the connection profiles.

When the application 210 is running on one of the provisioned computing devices 202, it may request a connection based on the purpose identifier 218 and receive the corresponding connection profile(s) with which the application 210 may initiate a connection session, but without the application 210 having knowledge of the underlying configuration data for establishing the connection. In this manner, the application 210 may span or access multiple network providers who provide resources that satisfy the purpose without including code specific to each network provider's interfaces.

Alternatively, the connection profile interface of the operating system 212 may, after identifying connection profiles that correspond to the connection(s) requested by the application 210, attempt to initiate connection session(s) based on the identified connection profiles on behalf of the application 210. When connections session(s) are successfully established, the connection profile interface of the operating system 212 may provide the established connection session(s) to the application 210. In this example, the connection profile interface does not provide the configuration information to the requested application 210.

In an example, purpose identifiers 218 include globally unique identifiers (GUIDs). For instance, purpose identifiers 218 may include a purpose identifier GUID for general Internet, a purpose identifier GUID for a multimedia message service (MMS), a purpose identifier GUID for an instant messaging service (IMS), and a purpose identifier GUID for a secure user plane location (SUPL) service.

Purpose identifiers 218 may include, as examples but without limitation, an audio stream purpose identifier, a video stream purpose identifier, a rich messaging purpose identifier, a VOIP purpose identifier, a cellular connection purpose identifier, a Wi-Fi connection purpose identifier, a location service purpose identifier, and more. Further, purpose identifiers 218 may include purpose identifiers that indicate a required data rate transfer level, a required encryption level, required security characteristics, and other characteristics. In a further example, purpose identifiers 218 may include a 'free' purpose identifier and a 'costed' identifier, enabling applications 210 to select network resources based on the potential cost of use.

The connection profile 220 is associated with a network resource (e.g., network provider resources 106, etc.) that may be used by an application 210. The connection profile 220 may include and/or be associated with purpose identifiers 218. Further, the connection profile 220 may specify an identifier that indicates a source (e.g., company, owner, etc.) of the associated network resource. The connection profile 220 may further have particular cost attributes, performance attributes, and the like. Further, the connection profile 220 may include current state information, such as whether the connection is currently in use, or that the connection may only be activated "on demand". Alternatively, a connection may be an exclusive resource, such that only one application may use the connection at a time. The connection profile 220 provides configuration data that may be used by the applications 210 to connect and interact with the network resource associated with the connection profile 220. In some examples, the connection profiles 220 are provided to the applications 210, but the configuration data is not provided to the applications 210. In this manner, the configuration data 220 is abstracted from the applications 210.

Aspects of the disclosure may receive, from a process (e.g., application 210), a request for a first connection and a second connection to one or more network provider resources (e.g. network provider resources 106). For example, the same process may request a messaging connection and a video call connection. The request including a first purpose identifier (e.g., purpose identifier 218) associated with the first connection and a second purpose identifier associated with a second connection. In response to the received request, based on the mapping 216, a first connection profile (e.g., connection profile 220) associated with the first purpose identifier and a second connection profile associated with the second purpose identifier are provided to the process. This enables the process to access the network provider resource(s) via the identified first and second connection profiles. In this example, the process may initiate and maintain two, simultaneous and/or sequential connections to one or more network provider resources.

In an example, the mapping 216 includes an ordered, or otherwise enumerated, list of connection profiles 220 which correspond to one purpose identifier 218. For instance, the ordered list may be arranged such that connection profiles 220 in early positions are higher priority than connection profiles 220 in later positions. The connection profiles 220 may be arranged in the ordered list such that the early position connection profiles 220 correspond to connections which are faster, capable of higher bandwidth, more reliable, more likely to be available, etc. Further, current state information of the connection may be used to determine order or priority of connection profiles 220 in the list, such that a connection profile 220 associated with a connection already in use by another application may be prioritized higher in the list. The program code may be configured to identify a connection profile 220 from the ordered list based on the position of the identified connection profile 220 in the ordered list. For example, the application 210 may attempt to initiate connection sessions with each connection profile 220 in the list in order until a successful connection session is initiated.

Alternatively or in addition, a user preference may be used when setting priority positions of connection profiles 220. The preference may be for connections with a certain performance attribute or cost attribute. For instance, a user may provide a preference that only 'free' network resources are used, or that only connections with a certain level of performance are used. The preference may be provided as an argument or other input in the API request for the connection profiles. The connection profiles are then prioritized based on the user preference.

The computer program code may further store a connection session record (e.g., in memory 208, etc.) that includes connection profiles provided to a process (e.g., an application 210, etc.) when access to at least one network provider resource has been successfully provided to the process. Subsequent connection profiles may be identified based on the stored connection session records. For instance, a connection profile that has provided access to a network provider resource in the past as indicated by a connection session record may be prioritized for use in the future due to the record of previous success.

Figure 5:
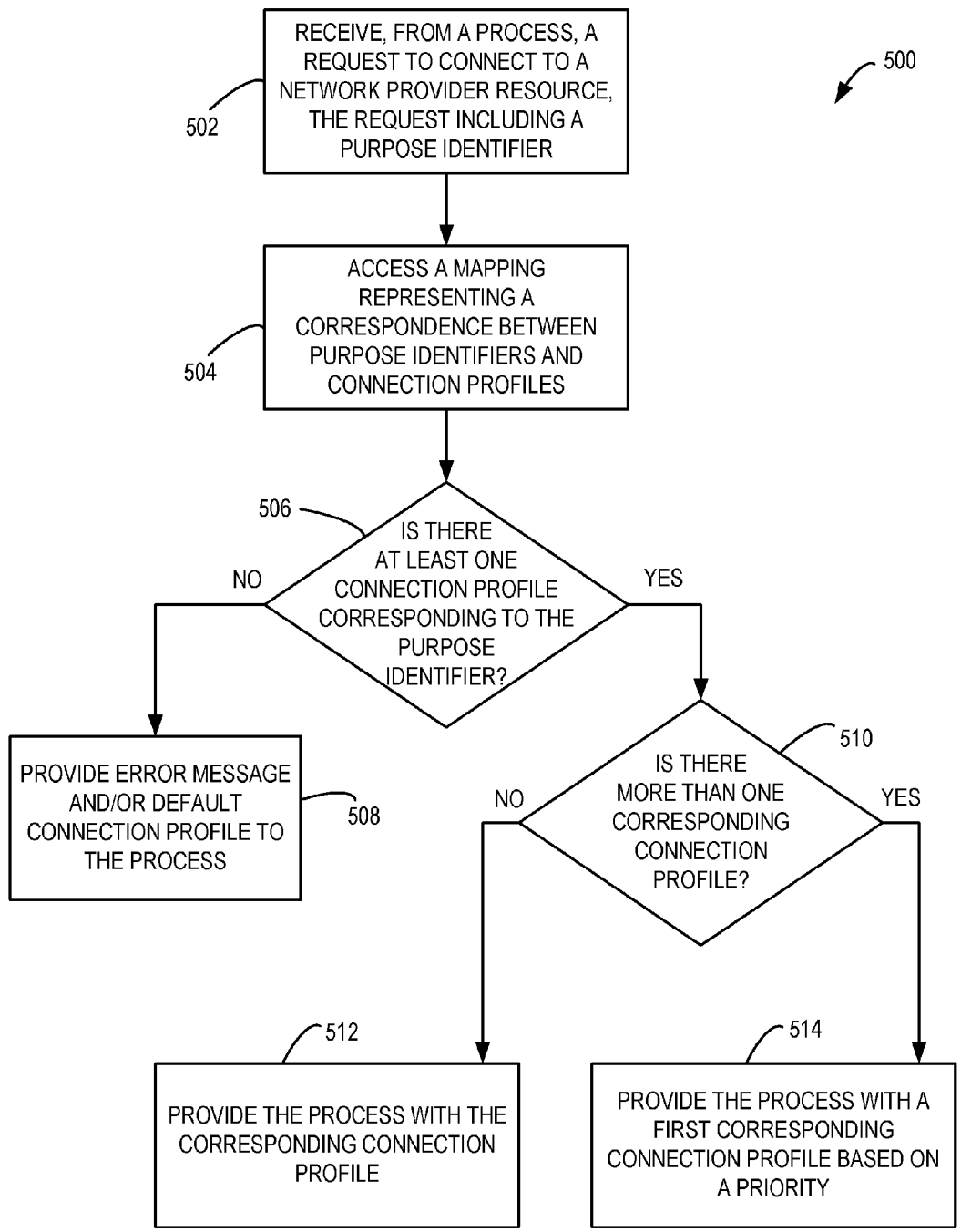
FIG. 5 illustrates a flow chart of an example method of providing a process with a connection profile based on a purpose identifier, including handling different numbers of compatible connection profiles.
Figure 6:
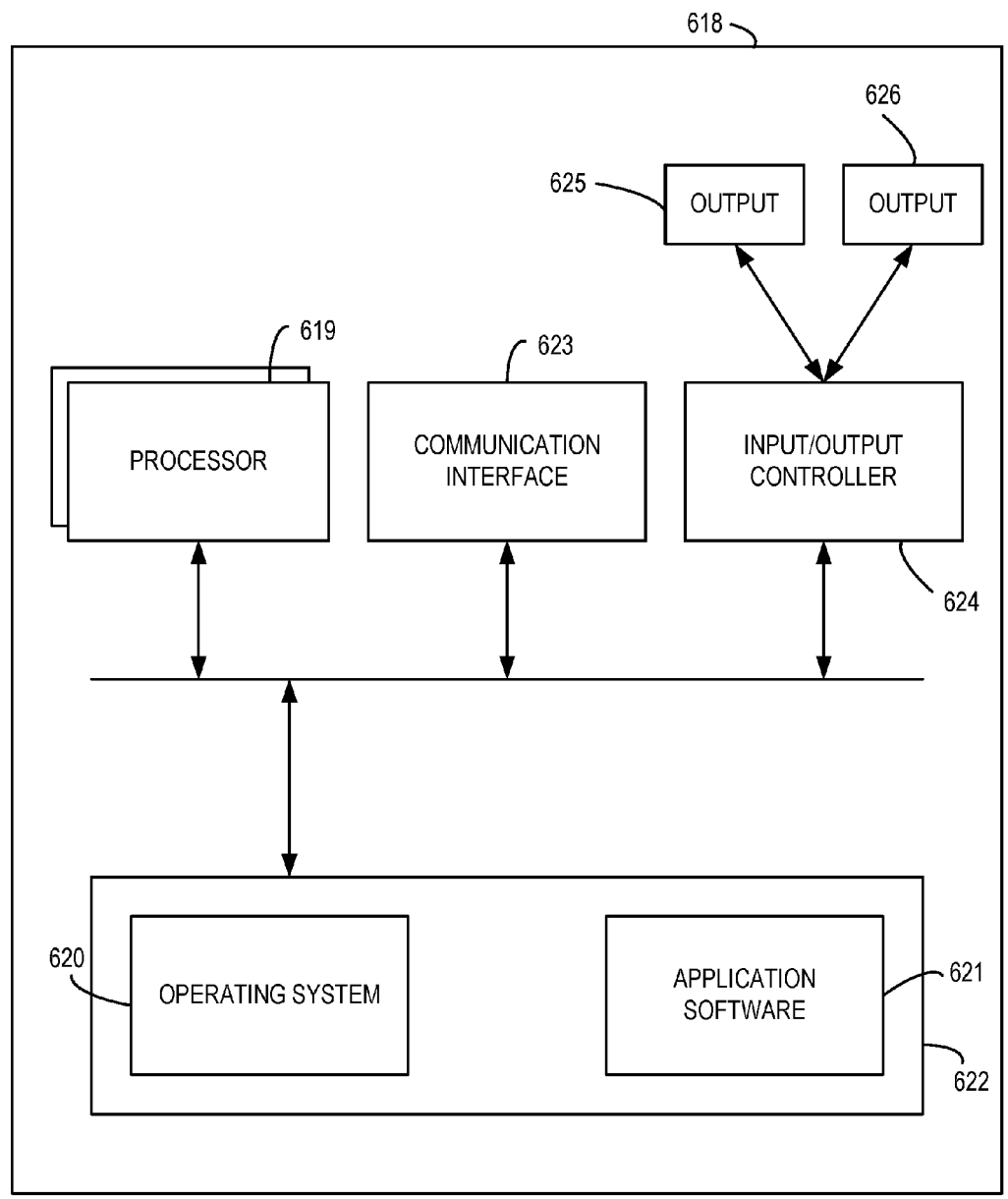
FIG. 6 illustrates an example computing apparatus as a functional block diagram.

In an example, the memory 208 may comprise one or more computer storage media having computer-executable instructions that, upon execution by a processor, cause the processor to perform instructions, such as those shown in FIG. 5 and FIG. 6.

In examples having a plurality of purpose identifiers 218, the connection profile 220 may include one connection profile 220 that is associated with each of the plurality of purpose identifiers 218. For instance, the connection profile 220 may be associated with both a general Internet purpose identifier and a video streaming purpose identifier. When an application 210 requests connections with both the general Internet and video streaming purpose identifiers, the requesting application 210 may receive a single connection profile 220 associated with both requested purpose identifiers.

Alternatively, an application 210 requesting a connection including multiple purpose identifiers 218 may result in identification of multiple connection profiles 220. For instance, if the application request includes three purpose identifiers 218, three connection profiles 220 may be identified with each of the three connection profiles 220 satisfying at least one of the three purpose identifiers 218. Alternatively, if a connection profile 220 is associated with more than one of the three purpose identifiers 218, fewer than three total connection profiles 220 may be identified.

Figure 3:
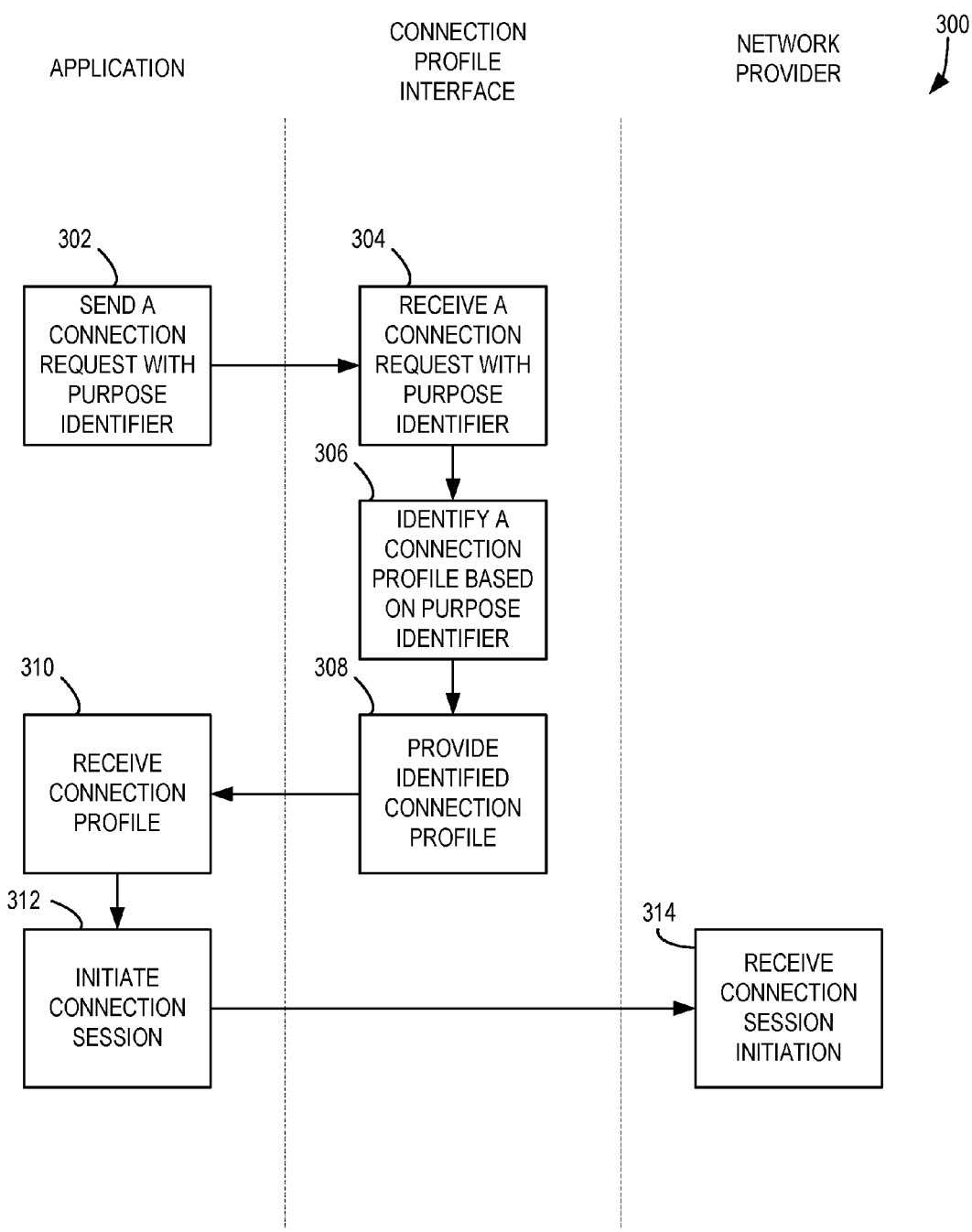
FIG. 3 illustrates a sequence diagram of an example method of providing a connection to an application based on a purpose identifier.

FIG. 3 illustrates a sequence diagram of an example computerized method 300 for providing a connection to an application (e.g., an application 210, etc.) based on a purpose identifier (e.g., a purpose identifier 218, etc.).

At 302, the application sends a connection request, or other request to connect to a network provider resource, including a purpose identifier to a connection profile interface of the operating system (e.g., operating system 212, etc.). The connection profile interface receives the connection request with the purpose identifier at 304.

At 306, the connection profile interface uses the purpose identifier to identify a corresponding connection profile that is associated with the purpose identifier. For instance, the mapping 216 may be accessed by the operating system 212 to identify a connection profile that corresponds with the received purpose identifier. The connection profile interface may be an API that takes the purpose identifier(s) as arguments, fields, or other input.

At 308, the connection profile interface provides the identified connection profile to the application, which receives the provided connection profile at 310.

Once the connection profile is received, the application attempts to initiate a connection session based on the connection profile at 312, such as through use of an API that takes identification of the connection profile as input. The network provider offering the network provider resource associated with the connection profile receives a connection session initiation request at 314. In an example, the connection profile includes configuration data that enables the operating system to identify and contact the network provider with the appropriate connection configuration for accessing the network provider resource. For instance, the connection profile may contain an address or similar identifier that specifically identifies the network provider, instructions and/or an interface that the application may use to contact the network provider and identify the specific network provider resource, information about the cost of use of the network provider resource, performance attributes of the network provider resource, etc.

As an alternative to operations 306, 308, 310, 312, and 314, the connection profile interface may initiate a connection session based on the identified connection profile without further involving the application. In such an example, the application requests a connection based on the purpose identifier as described herein, and in response receives an active connection session from the connection profile interface.

In an example, the initiation of the connection session may fail as a result of a poor quality network connection, lack of a connection, outdated connection profile, or other possible errors. The application (or operating system) may generate an error report or the like, and may further send another connection request with the purpose identifier, as at 302. Alternatively, the connection profile interface may provide more than one connection profile (e.g., an ordered list of corresponding connection profiles) in response to a previous request. In that case, the application may initiate a connection session with a different network provider, different configuration, and/or network provider resource based on a different provided connection profile.

Figure 4:
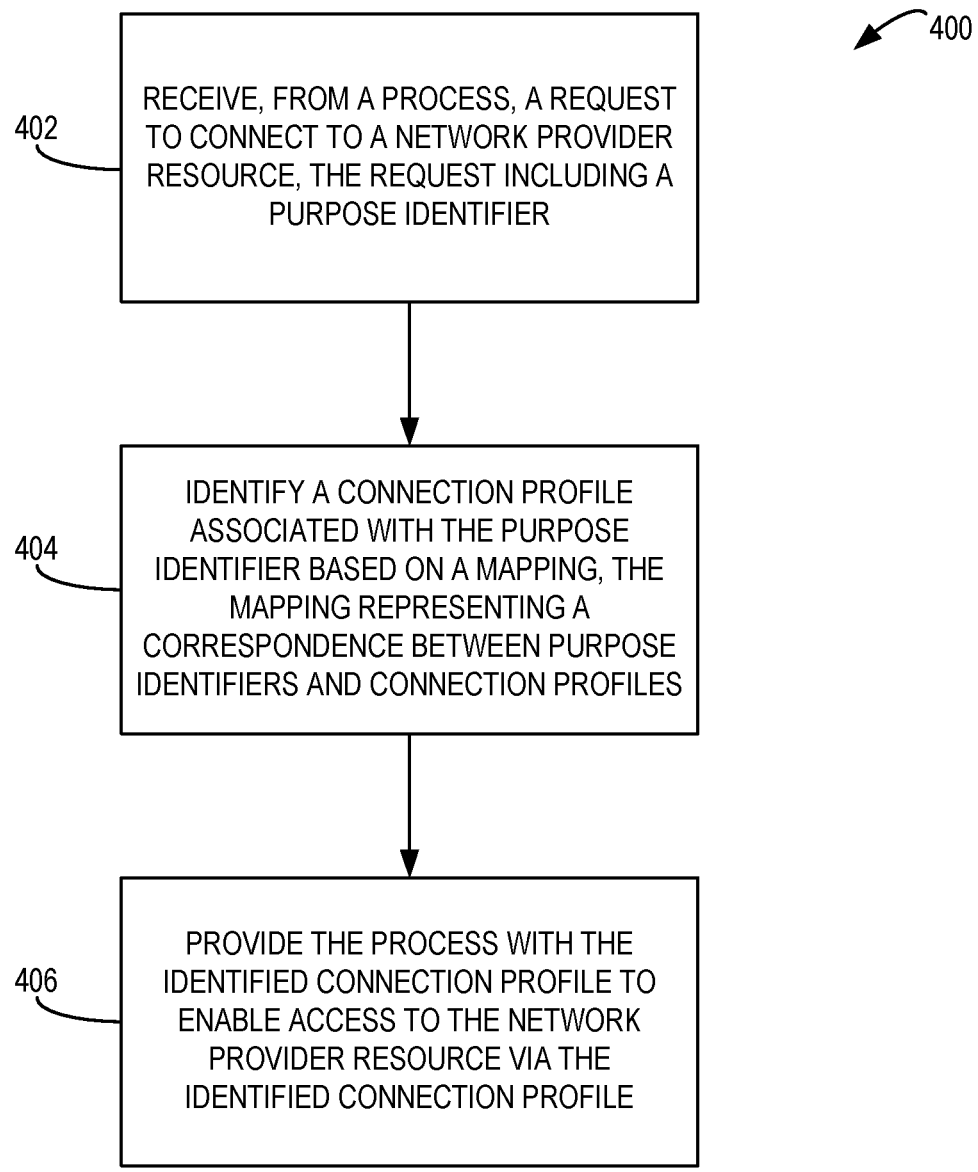
FIG. 4 illustrates a flow chart of an example method of providing a process with a connection profile based on a purpose identifier.

FIG. 4 illustrates a flow chart of a method of providing a process with a connection profile based on a purpose identifier. At 402, a connection profile interface (which may be associated with and/or provided by an operating system, such as operating system 212) receives, from a process, a request to connect to a network provider resource, the request including at least one purpose identifier. The purpose identified field in the request may include a comma-separated list of GUIDs corresponding to purpose identifiers. At 404, in response to the received request, the connection profile interface identifies a connection profile associated with the purpose identifier based on a mapping, the mapping representing a correspondence between purpose identifiers and connection profiles. At 406, the connection profile interface provides the process with the identified connection profile to enable access to the network provider resource via the identified connection profile. It should be understood that, in an example, the connection profile interface is an application programming interface (API) that may be associated with an operating system or the like.

It should be understood that, in an alternative example, the connection profile interface may identify more than one connection profile associated with the purpose identifier. Further, the connection profile interface may attempt to initiate a connection session with the identified connection profile(s) and provide a successfully initiated connection session to the process, as described above, without providing the identified connection profile to the application and/or without waiting for the application to initiate a connection session using the identified connection profile.

FIG. 5 illustrates a flow chart of a method for providing a process with a connection profile based on a purpose identifier, including handling different quantities of compatible connection profiles. At 502, a connection profile interface receives, from a process, a request to connect to a network provider resource, the request including a purpose identifier. At 504, the connection profile interface accesses a mapping representing a correspondence between purpose identifiers and connection profiles. For instance, the mapping (e.g., mapping 216, etc.) may be accessed by the connection profile interface to identify a connection profile that corresponds with the received purpose identifier.

At 506, the connection profile interface determines whether there is at least one connection profile corresponding to the requested purpose identifier in the mapping. If the mapping does not contain a connection profile that corresponds to the requested purpose identifier, the connection profile interface provides an error message and/or a default connection profile to the process at 508. For instance, the connection profile interface may notify the process that the requested network resource is not available via an error message or the like. Alternatively, or additionally, the mapping may include a default connection profile that may be provided to processes in the event that a connection profile associated with a specific purpose identifier is not available. It should be understood that, due to the generic nature of the default connection profile, performance, connection quality, and the like may be poor when compared to connection profile tuned for a specific purpose.

If at least one connection profile corresponding to the requested purpose identifier is identified at 506, the connection profile determines if there is more than one corresponding connection profile at 510. If not, the connection profile interface provides the process with the identified connection profile at 512. If there are more than one corresponding connection profiles, the connection profile interface provides the process with a first corresponding connection profile of the plurality of corresponding connection profiles based on criteria, such as a priority of the connection profiles.

In an example, the connection profiles in the mapping (e.g., mapping 216, etc.) each include a cost attribute. The cost attribute may indicate whether the associated network resource is free or costed. Further, the cost attribute may indicate what the associated network resource will cost a user of the computing device to use. Identifying a connection profile from the plurality of connection profiles may further include prioritizing the identified connection profiles based on the cost attribute. For instance, the plurality of connection profiles may include two connection profiles that correspond with the purpose identifier requested. One of the two connection profiles may have a 'free' cost attribute, while the other connection profile may have a 'costed' cost attribute. The connection profile interface may prioritize the connection profile with the 'free' cost attribute such that the cost to a user of the computing device is reduced and/or minimized. The 'free' connection profile is identified to the process as prioritized over the 'costed' connection profile.

In an example, the connection profiles in the mapping (e.g., mapping 216, etc.) each include a performance attribute. The performance attribute may indicate a level of performance of the connection and/or network resource associated with the connection profile. For instance, a connection profile may have a performance attribute that indicates a particular data transfer rate or bandwidth of the network resource, a reliability of the network resource, an uptime percentage of the network resource, a latency of the network resource, a 'jitter' factor of the network resource, or the like. Identifying a connection profile from the plurality of connection profiles may further include prioritizing the identified connection profile based on the performance attribute. For instance, the connection profiles may include two connection profiles that correspond with the purpose identifier requested. One of the two connection profiles may have a high reliability performance attribute, while the other connection profile may have a low reliability performance attribute. The connection profile interface may prioritize the connection profile with the high reliability performance attribute such that the reliability of the connection is enhanced. Additionally, or alternatively, the connection profile interface may prioritize a connection profile based on multiple attributes, such as performance, cost, and/or a record of a previous successful connection, as described above.

FIG. 6 illustrates an example computing apparatus 618. In an embodiment, components of the computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, identifying of a connection profile based on a purpose identifier may be accomplished by software. Furthermore, it may communicate connection requests, connection profiles, and the like via network interfaces and/or connections.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

Additional Examples

An example API for acquiring a connection based on a given purpose identifier is shown below. This function call is invoked by a process to start a communication session based on purpose.
ConnectionSession AcquireConnection(GUID purposeGuid)

Another example API for acquiring connection profiles based on a connection profile filter is shown below. This function call is invoked by a process to obtain one or more connection profiles that match the provided profile filter (e.g., a purpose identifier, a cost preference, other attribute preferences, etc.).
IReadOnlyList
FindConnectionProfiles(ConnectionProfileFilter profileFilter)

Alternatively, or in addition to the other examples described herein, examples include any combination of the following:

A system comprising at least one processor and at least one memory comprising computer program code and a mapping, the mapping representing a correspondence between purpose identifiers and connection profiles, the at least one memory and the computer program code configured to, with the at least one processor, cause the at least one processor to:

receive, from a process, a request for a first connection and a second connection to at least one network provider resource, the request including a first purpose identifier associated with the first connection and a second purpose identifier associated with a second connection;

in response to the received request, identify, based on the mapping stored in the memory, a first connection profile associated with the first purpose identifier and a second connection profile associated with the second purpose identifier;

provide the process with the identified first and second connection profiles; and initiate, in response to a request received from the process, communication sessions between the process and the at least one network provider resource via the identified first and second connection profiles.

The system described above, wherein the computer program code is further configured to maintain simultaneous connection sessions using the first and second connection profiles.

The system described above, wherein the mapping includes an ordered list of connection profiles that correspond with the first purpose identifier; and wherein the first connection profile is identified based at least in part on a position of the first connection profile in the ordered list.

The system described above, wherein the at least one memory and the computer program code configured to, with the at least one processor, cause the at least one processor to further:

store a connection session record including the first and second connection profiles when access to the at least one network provider resource has been successfully provided to the process; and wherein identifying the first connection profile and the second connection profile further comprises identifying, based on at least one stored connection session record, a first connection profile associated with the first purpose identifier and a second connection profile associated with the second purpose identifier.

The system described above, wherein the network provider resource comprises at least one of a cellular network, a Wi-Fi network, a costed network, or a free network.

The system described above, wherein each of the first and second connection profiles includes a cost attribute; and wherein identifying the first and second connection profiles includes identifying the first and second connection profiles based, at least in part, on the included cost attributes.

A computerized method comprising:

receiving, from a process, a request to connect to a network provider resource, the request including a purpose identifier;

in response to the received request, identifying, based on a mapping, a connection profile associated with the purpose identifier, the mapping representing a correspondence between purpose identifiers and connection profiles, the connection profile associated with configuration data for connecting to the network provider resource;

providing the process with the identified connection profile; and initiate, in response to a request received from the process, a communication session between the process and the network provider resource via the identified connection profile.

The computerized method described above, wherein receiving and providing comprise receiving the request via an application programming interface (API) and providing the identified connection profile via the API.

The computerized method described above, wherein identifying comprises identifying the connection profile from a plurality of connection profiles, wherein each connection profile of the plurality of connection profiles is associated with the purpose identifier.

The computerized method described above, wherein each connection profile of the plurality of connection profiles includes a cost; and wherein identifying further comprises prioritizing the connection profile based on the cost of the connection profile.

The computerized method described above, wherein each connection profile of the plurality of connection profiles includes a performance attribute; and wherein identifying further comprises prioritizing the connection profile based on the performance attribute of the connection profile.

The computerized method described above, further comprising prioritizing the connection profile based on whether the connection profile is in use.

The computerized method described above, further comprising generating an error message when initiating the connection session with the network provider resource fails.

One or more computer storage media having computer-executable instructions that, upon execution by a processor, cause the processor to at least:

receive, from an application, a connection request for a network provider resource, the connection request including at least one purpose identifier;

identify at least one connection profile associated with the at least one purpose identifier, the connection profile associated with configuration data for connecting to the network provider resource; and initiate a communication session between the application and the network provider resource via the identified at least one connection profile, without providing the configuration data to the application.

The one or more computer storage media described above, wherein the request includes a plurality of purpose identifiers, wherein a plurality of the connection profiles are identified, and further comprising selecting one of the plurality of the connection profiles for accessing the network provider resource.

The one or more computer storage media described above, wherein receiving the connection request occurs via an application programming interface (API).

The one or more computer storage media described above, wherein the connection request further comprises a preference, and wherein the connection profile is identified based on the purpose identifier and the preference.

The one or more computer storage media described above, wherein a plurality of the connection profiles is identified, and wherein the plurality of the connection profiles is ordered based on a priority.

The one or more computer storage media described above, wherein the computer-executable instructions further cause the processor to:

store a connection session record including the at least one connection profile when access to the at least one connection session has been successfully provided to the application.

The one or more computer storage media described above, wherein a subsequent connection profile is identified based at least in part on the connection session record.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for identifying a compatible connection based on a purpose identifier and associated connection profile. The illustrated one or more processors 619 together with the computer program code stored in memory 208 and/or 622 constitute exemplary processing means for identifying a connection based on a received purpose identifier mapped to an associated connection profile.

The term "comprising" is used in this specification to mean including the feature(s) or act(s) followed thereafter, without excluding the presence of one or more additional features or acts.

The invention claimed is:

1. A system comprising:
   at least one processor; and
   at least one memory comprising computer program code and a mapping, the mapping representing a correspondence between purpose identifiers and an ordered list of connection profiles, the at least one memory and the computer program code configured to, with the at least one processor, cause the at least one processor to:
   receive, from a process, a request for a first connection and a second connection to at least one network provider resource, the request including a first purpose identifier associated with the first connection and a second purpose identifier associated with the second connection;
   in response to the received request, identify, based on the mapping stored in the memory, a first connection profile associated with the first purpose identifier and a second connection profile associated with the second purpose identifier, the first connection profile being identified based at least in part on a position of the first connection profile in the ordered list;
   provide the process with the identified first and second connection profiles;
   initiate, in response to a request received from the process, simultaneous communication sessions between the process and the at least one network provider resource via the identified first and second connection profiles; and
   store a connection session record including the first and second connection profiles upon successfully providing the process with access to the at least one network provider resource.

2. The system of claim 1,
   wherein identifying the first connection profile and the second connection profile further comprises identifying, based on at least one stored connection session record, a first connection profile associated with the first purpose identifier and a second connection profile associated with the second purpose identifier.

3. The system of claim 1, wherein the at least one network provider resource comprises at least one of a cellular network, a Wi-Fi network, a costed network, or a free network.

4. The system of claim 1, wherein each of the first and second connection profiles includes a cost attribute; and wherein identifying the first and second connection profiles includes identifying the first and second connection profiles based, at least in part, on the included cost attributes.

5. A computerized method comprising:

receiving, from a process, a request for a first connection and a second connection to at least one network provider resource, the request including a first purpose identifier associated with the first connection and a second purpose identifier associated with the second connection;

in response to the received request, identifying, based on a mapping, a first connection profile associated with the first purpose identifier and a second connection profile associated with the second purpose identifier, the mapping representing a correspondence between purpose identifiers and an ordered list of connection profiles, the first connection profile being identified based at least in part on a position of the first connection profile in the ordered list;

providing the process with the identified first and second connection profiles;

initiate, in response to a request received from the process, simultaneous communication sessions between the process and the at least one network provider resource via the identified first and second connection profiles; and store a connection session record including the first and second connection profiles upon successfully providing the process with access to the at least one network provider resource.

6. The computerized method of claim 5, wherein receiving and providing comprise receiving the request via an application programming interface (API) and providing the identified connection profile via the API.

7. The computerized method of claim 5, wherein each of the plurality of connection profiles includes a cost; and wherein identifying further comprises prioritizing the first and second connection profiles based on the cost of the first and second connection profiles.

8. The computerized method of claim 5, wherein each of the plurality of connection profiles includes a performance attribute; and wherein identifying further comprises prioritizing the first and second connection profiles based on the performance attributes of the first and second connection profiles.

9. The computerized method of claim 5, further comprising prioritizing the first and second connection profiles based on whether the first and second connection profiles are in use.

10. The computerized method of claim 9, further comprising generating an error message when initiating the connection session with the at least one network provider resource fails.

11. One or more computer memories having computer-executable instructions that, upon execution by a processor, cause the processor to at least:

receive, from an application, a request for a first connection and a second connection to at least one network provider resource, the request including a first purpose identifier associated with the first connection and a second purpose identifier associated with the second connection;

in response to the received request, identify, based on a mapping, a first connection profile associated with the first purpose identifier and a second connection profile associated with the second purpose identifier, the mapping representing a correspondence between purpose identifiers and an ordered list of the connection profiles, the ordered list of connection profiles associated with configuration data for connecting to the at least one network provider resource, the first connection profile being identified based at least in part on a position of the first connection profile in the ordered list;

provide the application with the identified first and second connection profiles;

initiate, in response to a request received from the application, simultaneous communication sessions between the application and the at least one network provider resource via the identified first and second connection profiles, without providing the configuration data to the application; and store a connection session record including the first and second connection profiles upon successfully providing the application with access to the at least one network provider resource.

12. The one or more computer memories of claim 11, wherein the request includes the first and second purpose identifiers, wherein the first and second connection profiles are identified, and further comprising selecting one of the first or second connection profiles for accessing the at least one network provider resource.

13. The one or more computer memories of claim 11, wherein receiving the request occurs via an application programming interface (API).

14. The one or more computer memories of claim 11, wherein the request further comprises a preference, and wherein the first and second connection profiles are identified based on the first and second purpose identifiers and the preference.

15. The one or more computer memories of claim 11, wherein the first and second connection profiles are ordered based on a priority.

16. The one or more computer memories of claim 11, wherein a subsequent connection profile is identified based at least in part on the connection session record.

17. The system of claim 1, wherein the computer program code is configured, with the at least one processor, to cause the at least one processor to receive the request via an application programming interface (API) and provide the process with the identified first and second connection profiles via the API.

18. The system of claim 1, wherein each of the first and second connection profiles includes a performance attribute; and wherein identifying the first and second connection profiles includes prioritizing the first and second connection profiles based on the performance attribute of the first and second connection profiles.

19. The computerized method of claim 5, wherein the at least one network provider resource comprises at least one of a cellular network, a Wi-Fi network, a costed network, or a free network.

20. The one or more computer memories of claim 11, wherein the at least one network provider resource comprises at least one of a cellular network, a Wi-Fi network, a costed network, or a free network.

* * * * *